(12) United States Patent
Lietz

(10) Patent No.: US 7,687,721 B2
(45) Date of Patent: Mar. 30, 2010

(54) MULTI-LAYERED ELECTRICAL FLAT STRIP CONDUCTOR

(75) Inventor: Franz-Josef Lietz, Oberhausen-Lirich (DE)

(73) Assignee: Auto Kabel Managementgesellschaft mbH, Hausen i.W. (DE)

( * ) Notice: Subject to any disclaimer, the term of this patent is extended or adjusted under 35 U.S.C. 154(b) by 267 days.

(21) Appl. No.: 11/815,144

(22) PCT Filed: Feb. 3, 2006

(86) PCT No.: PCT/EP2006/050659
§ 371 (c)(1),
(2), (4) Date: Jul. 31, 2007

(87) PCT Pub. No.: WO2006/082238
PCT Pub. Date: Aug. 10, 2006

(65) Prior Publication Data
US 2008/0128153 A1 Jun. 5, 2008

(30) Foreign Application Priority Data

| Feb. 3, 2005 | (EP) | ................................... 05002211 |
| Jun. 13, 2005 | (EP) | ................................... 05012641 |
| Sep. 8, 2005 | (EP) | ................................... 05019546 |

(51) Int. Cl.
*H01B 7/00* (2006.01)

(52) U.S. Cl. ............................... 174/117 F; 174/117 FF
(58) Field of Classification Search ............. 174/110 R, 174/113 R, 117 R, 117 F, 117 FF, 74 R, 84 R
See application file for complete search history.

(56) References Cited

U.S. PATENT DOCUMENTS

| 2,805,399 | A | * | 9/1957 | Leeper ........................ 333/136 |
| 2,891,222 | A | * | 6/1959 | Freen .......................... 333/124 |
| 4,230,898 | A |   | 10/1980 | Emmel |
| 4,821,409 | A | * | 4/1989 | Nager, Jr. ..................... 29/747 |
| 5,281,933 | A | * | 1/1994 | Chamberlin ................. 333/132 |
| 5,689,218 | A | * | 11/1997 | Stein et al. ................... 333/125 |
| 6,162,991 | A | * | 12/2000 | Tayama et al. ............. 174/71 C |
| 6,362,709 | B1 | * | 3/2002 | Paxman et al. .............. 333/245 |
| 2004/0182595 | A1 |  | 9/2004 | Halter |

FOREIGN PATENT DOCUMENTS

| EP | 0007478 | 7/1979 |
| WO | 0150482 | 7/2001 |

* cited by examiner

*Primary Examiner*—William H Mayo, III
(74) *Attorney, Agent, or Firm*—Sunstein Kann Murphy & Timbers LLP

(57) ABSTRACT

Motor vehicle battery cable having a power conductor which is in the form of a flat strip conductor and is surrounded by an insulating layer. To reduce the number of cable harnesses in motor vehicles, it is proposed that at least two further conductors be run in the insulating layer.

22 Claims, 5 Drawing Sheets

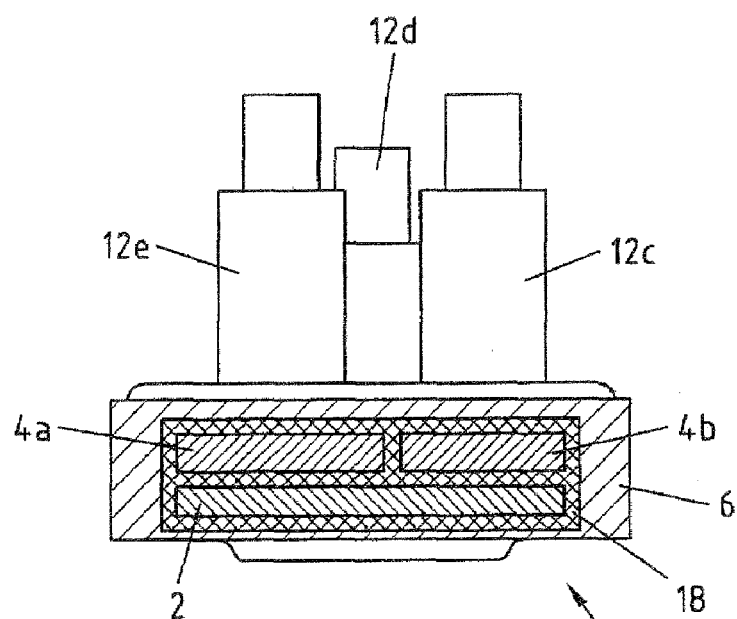
Fig.8
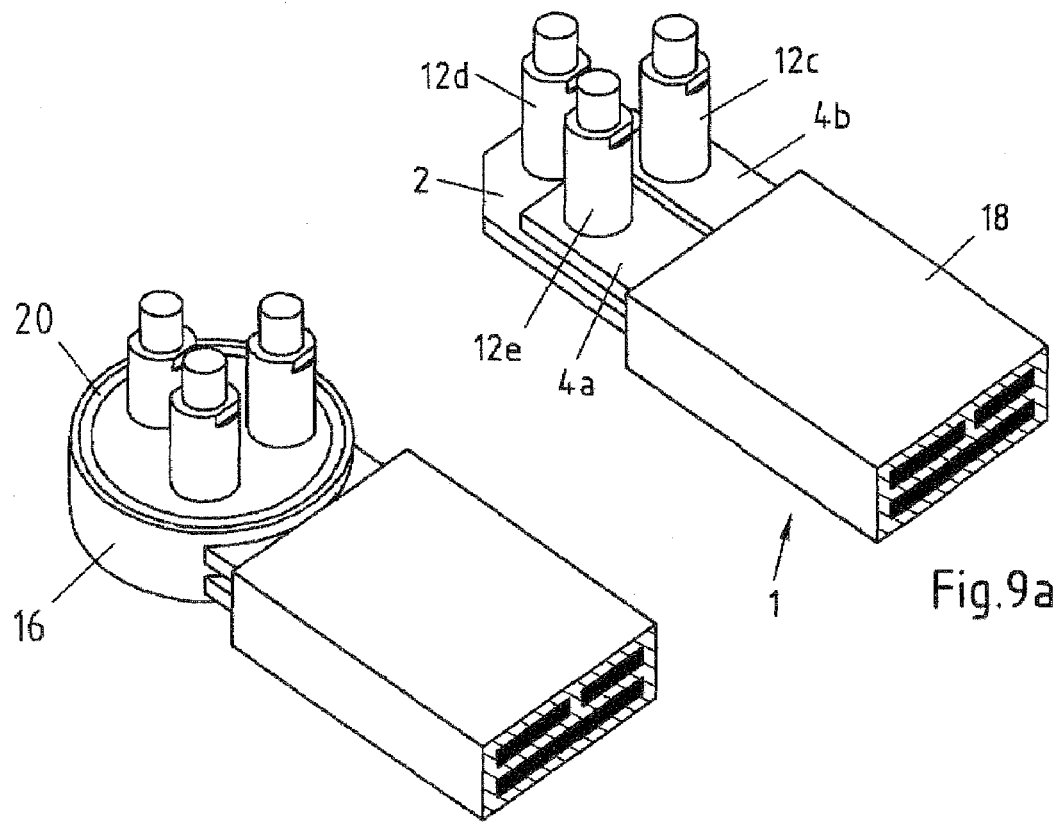
Fig.9a
Fig.9b

MULTI-LAYERED ELECTRICAL FLAT STRIP CONDUCTOR

TECHNICAL FIELD

The invention relates to electrical cables for motor vehicles, in particular for battery cables in motor vehicles, having a power conductor which is in the form of a flat strip conductor and is surrounded by an insulating layer.

BACKGROUND

What are used nowadays for battery cables in motor vehicle construction are power cables which are notable for their high current carrying capacity. Particularly in vehicles in which the vehicle's battery is not arranged in the engine compartment, the battery cables are often run through the whole of the bodywork. Hence, it is often possible for tappings to be taken off the battery cables at various points within the bodywork.

Because not only the volume of data that occurs in motor vehicles is growing, power conductors are laid in motor vehicles but also a plurality of data conductors. For example, many components of vehicles that are important to their operation are nowadays addressed via the so-called CAN bus or the LIN bus. The laying of cables for transmitting data is proving to be difficult in vehicle construction because a large number of finely branched cable harnesses have to be installed in the vehicles. Because of the large number of cables, it may be a problem to keep said cables apart from one another. At the time of fitting, the fitter has to be punctilious in seeing that the cable harnesses are fitted correctly.

It is a disadvantage that, as well as the lines carrying power, data lines also have to be laid in motor vehicles, which means greater cost and complication in the fitting and a greater likelihood of errors. A large number of cables also entails a disadvantage in terms of space and weight as compared with concentrated components.

In present-day vehicles having multi-voltage 12V and 48V electrical systems, it is not only the usual battery cables but also further cables which are required as power conductors. The reduction in the space available and the automated method of fitting call for conductors which are easy to fit and which save space when fitted. This requirement is even more important with multi-voltage electrical systems because a dedicated line carrying power has to be run through the bodywork for each of the battery voltages. Tappings are required at various points in the electrical system. This can hardly be achieved with the conventional cable looms made up of round conductors.

From the disadvantages deduced above comes the object of providing an electrical cable for motor vehicles which, in a simplified way, allows a plurality of lines to be fitted at the same time.

SUMMARY OF THE INVENTION

To achieve this object, the invention proposes an electrical cable for motor vehicles having a power conductor which is in the form of a flat strip conductor and is surrounded by an insulating layer, which cable is characterised in that at least one further conductor is run in the insulating layer.

The power conductor is designed to take the form of a flat strip conductor because of the good current carrying capacity of flat strip conductors and the ease with which they can be laid. To simplify data communications in motor vehicles or even to simplify the fitting of multi-voltage electrical systems, the flat strip conductor is used, in accordance with the invention, as a carrier for further flat conductors. To this end, the invention proposes that at least one further conductor be run in the insulating layer of the flat strip conductor. It is preferred however for there to be two or more further conductors. The further conductors may be of considerably smaller cross-section than the power conductor. When the flat strip conductor is being laid, a data line, or a line carrying power of a different electrical-system voltage, may also be laid directly through the bodywork. This brings down the cost and effort of fitting and reduces the amount of space required.

It is preferred for the conductors to be formed from solid material. Such conductors are easier to produce than conductors composed of twisted strands. Flat parts produced from sheets or strips are particularly suitable for the production of the conductors. What are preferred in this case are sheets or strips extruded from soft-annealed aluminium.

It is also possible for use to be made of cut conductors, conductors drawn from wire or even rolled conductors. It is also possible for conductors of non-ferrous metal, and preferably copper conductors, to be used.

For the conductors to be correctly arranged in space within the cable, it is preferable for the conductors to be run in a carrier profile of insulating material. The carrier profile may be shaped at suitable points to receive the conductors. By this means, a plurality of flat conductors can be joined together to form a cable according to the invention. The carrier profile is an integral part of the cable and not a cable duct to receive a plurality of cables. The carrier profile is insulated, together with the conductors, in the course of production. This can be done by extrusion. The conductors and/or the carrier profile can also be insulated by powder coating or lacquering.

The receptacles in the carrier profile for the cables may be separated by an insulating layer. In particular, two or more conductors separated by insulating layers may be arranged next to one another in a plane. For this purpose, it is proposed that at least two receptacles separated by a partition extending along the conductors be provided on at least one side of the carrier profile.

To enable a plurality of cables according to the invention to be arranged next to one another, it is also proposed that the carrier profile comprises a receptacle at one outer side and a profiling at its other outer side, in such a way that a plurality of carrier profiles can be combined in modular fashion with the help of the receptacle and profiling. The profiling may be a dove-tail profiling. The corresponding receptacle comprises a cross-section corresponding to the profiling, which means that the profiling fits into the receptacle form-closed and friction-fitted. The receptacle and profiling may also be formed after the fashion of a snap-action closure. In this way, two or more cables can be arranged next to one another.

It is preferable for the profile of the flat strip conductor to be rectangular. Any other profile, such as U-shaped, C-shaped, square or T-shaped for example, is also possible. Because the power conductor takes the form of a flat strip conductor, it can be used as a carrier for a plurality of data conductors. In an advantageous embodiment, it is proposed that the data conductors be run at least along the wide side of the profile of the flat strip conductor. It is also possible, in addition or as an alternative, for the data conductors to be arranged along the short side.

A plurality of conductors may be laid either parallel to a plane of the flat strip conductor or one above the other. If they are laid in parallel, the carrier profile is particularly suitable for insulating the conductors from one another.

Because the weight of cable harnesses in motor vehicles is becoming an increasingly important consideration, it is proposed that the conductors be formed from aluminium. This gives advantages in cost and weight over copper cables, even though the aluminium conductor has to comprise a larger cross-section than the copper conductor due to its low current carrying capacity. However, it is also proposed that the conductors be formed from copper, this making particularly good sense when the dissipated power in the conductors is to be as low as possible.

It may be necessary for tappings to be taken from individual conductors along the power conductor. It is therefore proposed that a tapping from at least one conductor be run out from the insulating layer.

It is proposed for this purpose that, where conductors are arranged one above the other, tappings be arranged one downstream of the other along an axis. The axis may be the longitudinal axis of the cable, i.e. may be longitudinal to the direction in which current flows. The tappings, in particular interfacing terminal points and terminal points for jump starting, are then situated one downstream of the other on the axis of the cable. It is also proposed that the tappings be arranged parallel to the cable in a plane. This plane may be the plane of the wide side of the cable. When this is the case, the tapping from the lower conductor may be drawn upwards downstream of the tapping from the upper conductor, which means that the two tappings will lie substantially in a plane.

A particular large volume of data can be coped with if the at least one conductor is in the form of an optical waveguide. Optical waveguides are likely to suffer if subjected to small radii of curvature and can easily be damaged when being installed. It is therefore particularly beneficial for the optical waveguide to be run in the insulating layer, where it will be well protected against damage.

A further aspect of the invention is a method of producing an electrical cable for motor vehicles by forming a flat conductor as a power conductor, insulating the power conductor by means of an insulating layer and introducing at least one further conductor into the insulating layer.

Flat strip conductors can be produced particularly satisfactorily from the point of view of cost if they are cut from aluminium strip or sheet unwound from a coil. Extruded aluminium strips or rolled sheets can be transported easily when wound into coils. For production, the aluminium strip/sheet merely has to be uncoiled and cut into flat strip conductors. Flat conductors drawn from wire can also be used at low cost.

The insulating layer can be applied to the bundle of conductors by means of extrusion, powder coating or dip lacquering.

Before the extrusion, the conductors may be run in receptacles of a carrier profile. In this way the carrier profile can be insulated together with the conductors. This enables a cable according to the invention to be produced easily. Insulating layers between the conductors can be provided by the carrier profile. The conductors may rest directly against the walls of the carrier profile form-closed therewith.

It is also preferable for tappings to be provided at at least one end of the cable. A terminal point of its own may be provided in this case for each conductor. The tappings from two conductors arranged one above the other may be arranged directly consecutively of the other on the longitudinal axis of the flat strip conductor.

It is also preferable for tappings to be arranged at at least one end of the cable in such a way that the tappings from two conductors arranged in a plane are arranged next to and parallel to one another transversely to the longitudinal axis of the flat strip conductor.

To enable electrical connections to be made easily to tappings, or else cable lead-throughs through bodywork panels to be formed particularly easily, it is also proposed that tappings be arranged at at least one end of the cable in such a way that the tappings from at least two conductors are arranged in a plane parallel to the plane of the wide side of the cable. Because the terminal points are arranged parallel to the plane of the cable, and preferably lie in the same plane as this latter, cable lead-throughs through a bodywork panel can easily be made for both conductors. The flat strip cable can hug the bodywork panel tightly up to the point where the lead-through is situated, which means that only a small amount of space is taken up.

The fixing of the terminal points to the conductors by material connection is preferably performed by friction welding or multi-orbital welding.

These and other features of the invention will be explained in detail below by reference to drawings showing an embodiment.

BRIEF DESCRIPTION OF THE DRAWINGS

In the drawings:

FIG. 8 is a view in section of a cable having three terminal points.

FIG. 9 is a second view of a cable having three terminal points.

DETAILED DESCRIPTION OF THE DRAWINGS

Figure 1:
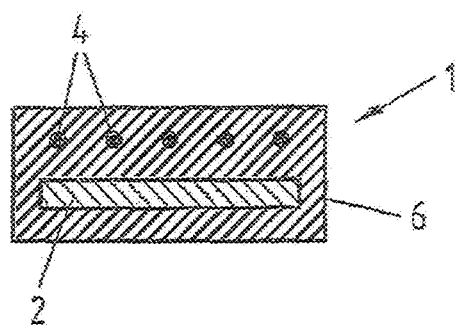
FIG. 1 is a first cross-section through an embodiment of electrical cable.

FIG. 1 shows an electrical cable 1 having a power conductor 2, in the form of a flat strip conductor, and a plurality of conductors 4.

The power conductor 2 and the conductors 4 are encapsulated together in an insulating layer 6. The power conductor 2 is preferably made of sheet aluminium or drawn aluminium wire. The conductors 4 are preferably of copper but may also be formed from other materials. The power conductor 2 is preferably made of aluminium, e-aluminium or alloys thereof. The insulating layer 6 is preferably made of polyvinyl chloride, polyethylene, resin or some other non-conductive material.

The conductors 4 are arranged parallel to the wide face of the power conductor 2. This enables a cable of shallow construction to be produced.

Figure 2:
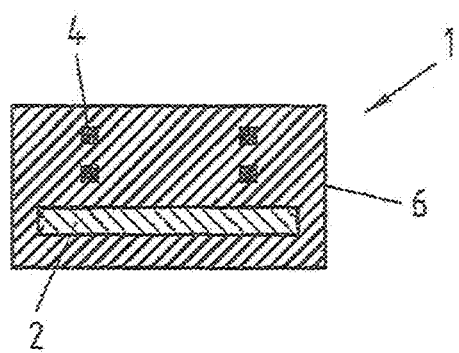
FIG. 2 is a second cross-section through an embodiment of electrical cable.

FIG. 2 shows a further electrical cable 1 having a power conductor 2 and conductors 4 which are encapsulated together in an insulating layer 6. The conductors 4 are arranged both next to one another and one above the other. A higher packing density can be achieved in this way.

Figure 3:
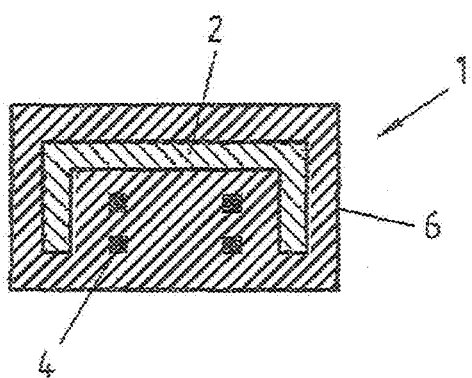
FIG. 3 is a third cross-section through an embodiment of electrical cable.

FIG. 3 shows an electrical cable 1 in which the power conductor 2 has a U-shaped profile. The conductors 4 may be arranged in the U-profile.

Figure 4:
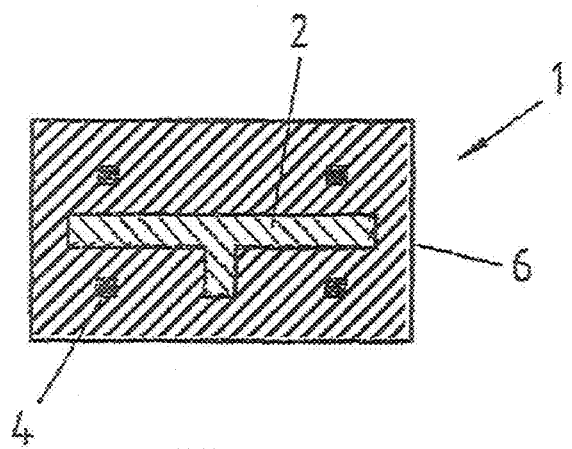
FIG. 4 is a fourth cross-section through an embodiment of electrical cable.

FIG. 4 is a cross-section through an electrical cable 1 in which the power conductor 2 has a T-shaped profile. The conductors 4 may be both rectangular, square and circular. The conductors 4 may also be optical waveguides.

Figure 5:
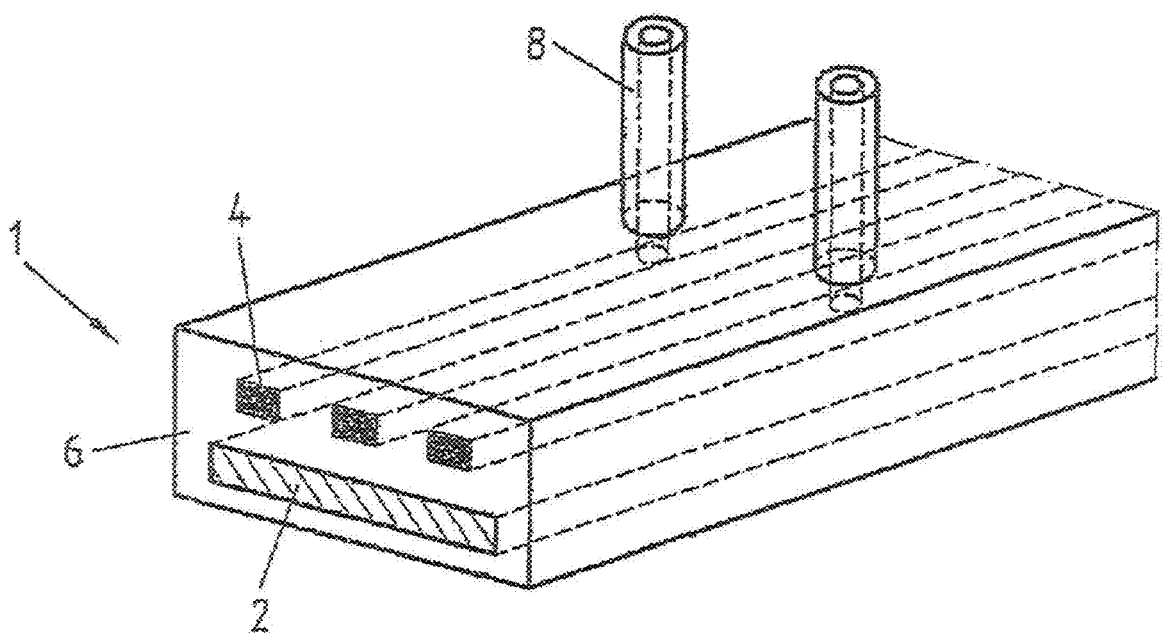
FIG. 5 is a plan view of an embodiment of electrical cable.

FIG. 5 is a view of an embodiment of electrical cable 1. What is shown is a section through an electrical cable 1 in which the power conductor 2 and the data lines 4 are encapsulated in the insulating layer 6. The data lines 4 can be run out at any desired points along the electrical cable 1. These tappings 8 may be arranged at any desired points along the electrical cable 1.

Figure 6:
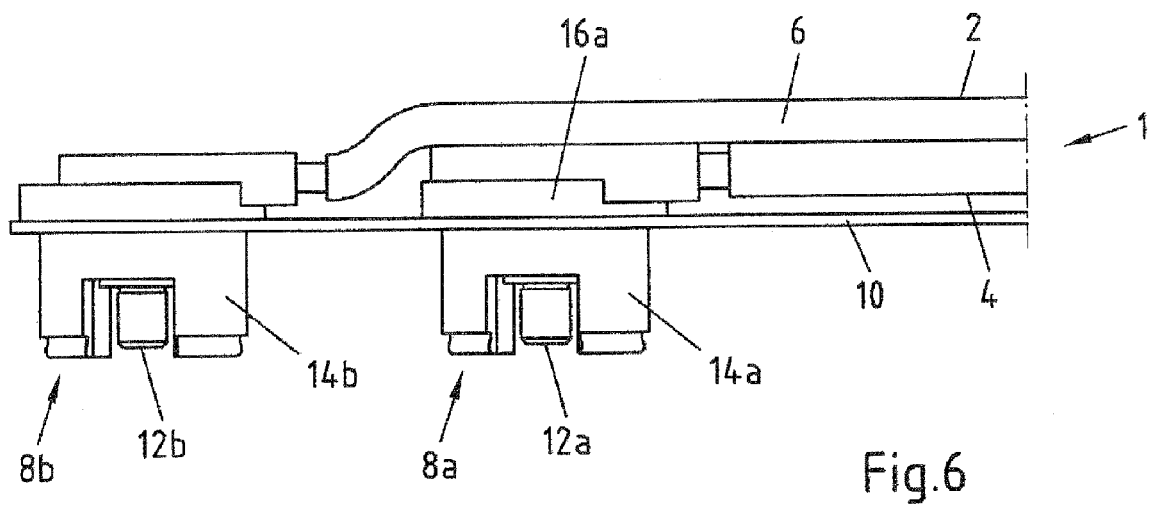
FIG. 6 is a view from the side of a cable having two terminal points one downstream of the other.

FIG. 6 is a view from the side of a layered cable 1 having two conductors. The conductors 2, 4 are arranged one above the other. The cross-section of the conductor 2 may be 150 mm$^2$ and that of the conductor 4 may be 150 mm$^2$. The two conductors 2, 4 are insulated in the outward direction by insulating layers 6. A further insulating layer (not shown) is arranged between the conductors 2, 4.

In the view, the cable 1 is arranged close to a panel 10, such for example as a bodywork panel. A terminal point 8a is arranged at one end of the conductor 4. The terminal point 8b comprises a pin 12a. The pin has been connected to the conductor 4 by material connection by friction welding or multi-orbital welding.

A recess can be cut in the insulating material 6 by means of a laser. It is preferable for the recess to be, at the minimum, smaller than, and preferably 0.01-10% of, the diameter of a projection on the pin 8, so that the circumferential surface of the projection will be in contact with the insulating material when the pin 8 is introduced into the recess.

For the welding together, the pin 8 is introduced into the recess. Multi-orbital welding tools (not shown) begin with an orbital movement in a plane parallel to the conductor 2 and the application of pressure takes place in a plane perpendicular thereto. The orbital movements of the workpieces 8 and 1 relative to one another may be elliptical or circular and between 90° and 180° out of phase. It is also possible for only the pin 8 to orbit and for the cable 1 to be clamped rigidly in place. The multi-orbital welding of the pin 8 to the cable 1 connects the end-face of the pin 8 to the conductor 2 or the conductor 4 by material connection. A connection by material connection or form-closed connection may also be made between the circumferential surface of the pin 8, or a ring shoulder thereon, and the insulating material 6.

As a result of the welding together, a welded connection by material connection is made between the pin 8 and the conductor 4 or the conductor 2 at least across the end-face of the pin 8. During the welding together, the insulating material 6 is melted and then clings firmly to the circumferential surface of the pin 8. This ensures that the weld is sealed off.

If a ring shoulder on the pin 8 is of metal, then a weld on the side of the ring shoulder adjacent the insulating material 6 may be a connection by material connection. During the welding together, the insulating material 6 is melted at the face concerned, due to the ring shoulder bearing against the said face, and a welded joint is produced form-closed.

In the event of the ring shoulder being formed from an insulating material, preferably from the same material as the insulating material 6, a welded connection by material connection is made between the ring shoulder and the insulating material 6 during the welding of the pin 8 to the conductor 4 or 2. This connection by material connection is likewise a secure and reliable means of sealing off the weld.

In a single stage of operation, the multi-orbital welding together of the cables ensures a connection for conductors whose position is stable and which is reliable, secure and beneficial.

As shown in FIG. 6, the terminal point 8a is fastened to the panel 10 by a fastener 14a. The fastener 14a, such as a bayonet-action fastener for example, engages the material moulded round the pin 12a. Because of the fastener 14, the terminal point 8a can be arranged directly on the panel 10, and a cable lead-through is obtained. To prevent electrical contact being made between the conductor 4 and the panel 10, insulation 16a is provided on the cable 4.

The terminal point 8b on the conductor 2 is arranged immediately downstream of the terminal point 8a. The conductor 2 is shaped in such a way that the terminal point 8b lies in a plane with the terminal point 8a. The space occupied can be made small in this way. The terminal point 8b is identical in construction to the terminal point 8a. By means of the arrangement shown, cable lead-throughs for a plurality of conductors 2, 4 can be made without any problems. It is easy for lead-throughs of this kind to be fitted.

Figure 7:
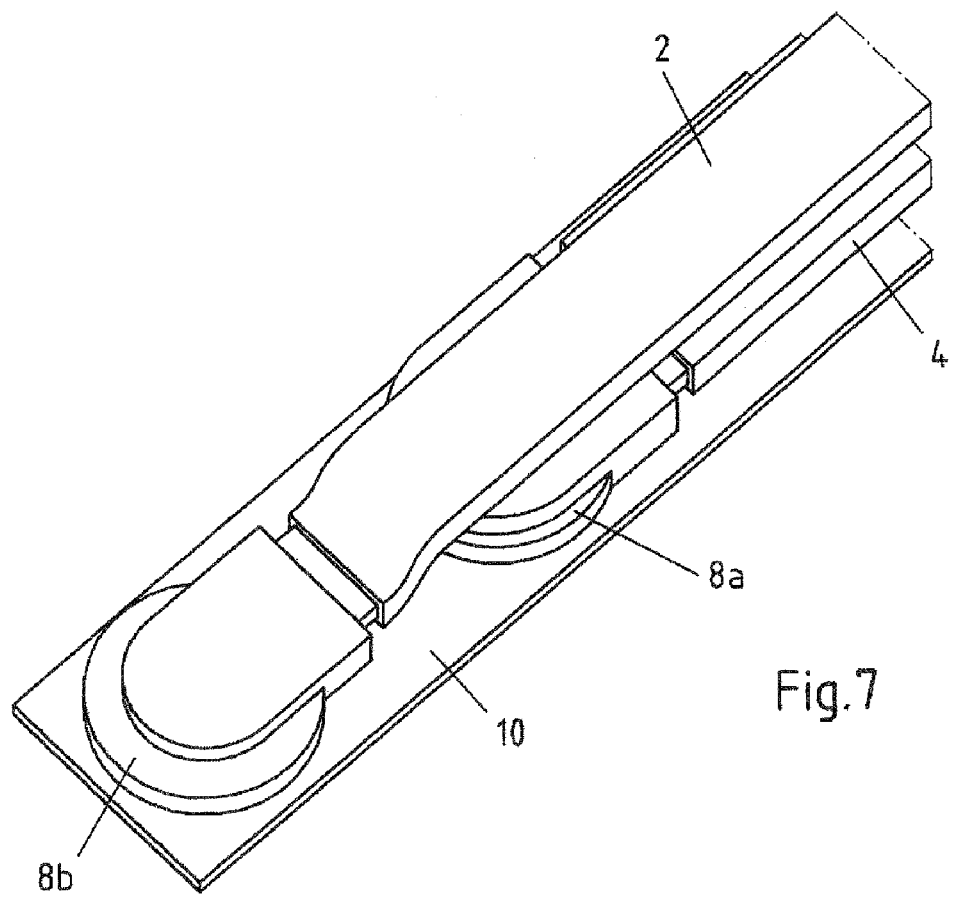
FIG. 7 is a second view of a cable having two terminal points one downstream of the other.

FIG. 7 is a view of a cable of the kind shown in FIG. 6. It can be seen that the terminal point 8b is situated immediately downstream of the terminal point 8a. It can also be seen that the terminal points 8 lie on the longitudinal axis of the conductors 2, 4.

FIG. 8 is a view in section of a cable 1. What can be seen are a conductor 2 and conductors 4a, 4b, which are arranged on a carrier profile. Together with the conductors 2, 4, the carrier profile 18 is surrounded by an insulating layer 6. A connection can be made to each conductor by means of a pin 12c-e. The pins 12 are applied to the conductors 2, 4 by material connection.

FIG. 9a is a view of the cable 1 of FIG. 8 without an insulating layer 6. It can be seen that the pins 12c, 12d are arranged parallel to one another, transversely to the longitudinal direction of the cable 1. The pin 12 is arranged directly downstream. Because of this arrangement close together of the pins, it is possible for a cable lead-through for a plurality of lines 2, 4 to be made in a small area.

FIG. 9b shows the arrangement of FIG. 9a but with the addition of insulation 16 which surrounds the three pins. The pins 12 can have the material moulded around them together. The insulation 12 may comprise an O-ring 20. This allows a cable lead-through to be sealed off satisfactorily from a bodywork panel.

Figure 10:
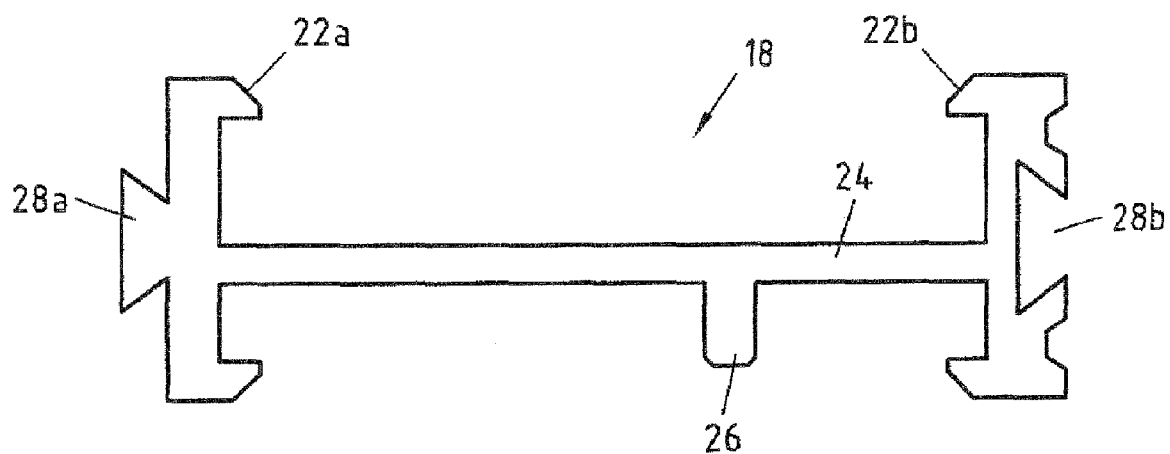
FIG. 10 is a view of a carrier profile.

FIG. 10 shows a carrier profile 18. The carrier profile 18 comprises on its upper side a receptacle for a first line. The receptacle is formed by undercut projections 22 having bevelled end-faces. Because of the bevelled end-faces, a conductor can be inserted in the receptacle by applying slight pressure. When the load applied is only low, the undercut projection stops the line from dropping out of the receptacle once it has been inserted.

An insulating layer 24 is provided between the upper receptacle and a lower receptacle. The lower receptacle is formed to receive two lines, with an insulating ridge 26 being provided between the lines. In the case of the lower receptacle too, a catch mechanism of the conductors into the receptacle is ensured by making the end-faces of a suitable design.

To allow a plurality of carrier profiles 18 to be combined in modular fashion one beside the other, the carrier profile comprises a dovetail profiling 28a on one side. A counterpart corresponding to this profiling 28a is formed on the other side in the form of a receptacle 28b. Receptacle 28b and profiling 28a enable a plurality of carrier profiles 18 to be plugged together next to one another The carrier profile 18, together with the inserted conductors, can be fed to an extruder in which insulation is applied to the entire structure.

Figure 11:
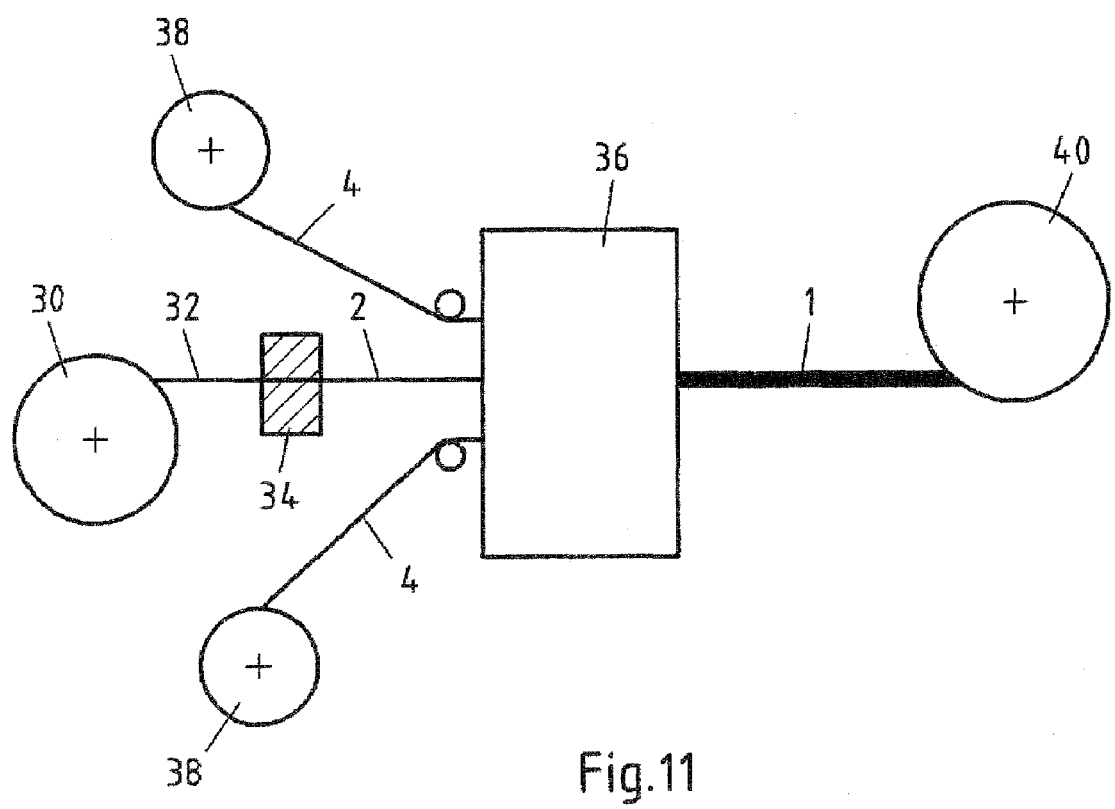
FIG. 11 is a schematic view of a method of production.

FIG. 11 shows a method of producing an embodiment of electrical cable 1. Aluminium sheet 32 unwound from a coil 30 is first divided into flat strip conductors in a dividing arrangement 34. The flat strip conductors are fed to an extruder 36 to serve as power conductors 2. In addition to a power conductor 2, conductors 4 are fed to the extruder 36 from coils 38. The conductors 4 may be electrical cables but may also be optical waveguides. In the extruder 36, the power conductors 2, together with the conductors 4, are encapsulated in insulation. The cable 1 can then be coiled into a fresh coil 40.

The invention claimed is:

1. A motor vehicle battery cable comprising:
    a power conductor, which is in the form of a flat strip conductor and is surrounded by an insulating layer;
    a further conductor run in the insulating layer;
    a tapping from at least one conductor of the group including the power conductor and the further conductor, wherein the tapping is run out from the insulating layer and wherein the tapping is a bolt friction welded to the at least one conductor.

2. The motor vehicle battery cable according to claim 1, wherein the conductors are formed from solid material.

3. The motor vehicle battery cable according to claim 1, wherein a further conductor is a data conductor.

4. The motor vehicle battery cable according to claim 1, wherein the conductors are run in a carrier profile of insulating material.

5. The motor vehicle battery cable according to claim 4, wherein the carrier profile comprises at least two receptacles separated by an insulating layer.

6. The motor vehicle battery cable according to claim 4, wherein at least one side of the carrier profile comprises at least two receptacles separated by a partition extending along the conductors.

7. The motor vehicle battery cable according to claim 4, wherein the carrier profile comprises a receptacle at one outer side and a profiling at its other outer side, in such a way that a plurality of carrier profiles can be combined in modular fashion with the help of the receptacle and profiling.

8. The motor vehicle battery cable according to claim 1, wherein the profile of at least one conductor is rectangular.

9. The motor vehicle battery cable according to claim 1, wherein the further conductor are run at least along the wide side of the profile of the flat strip conductor.

10. The motor vehicle battery cable according to claim 1, wherein the further conductors are run next to one another in a plane parallel to the power conductor.

11. The motor vehicle battery cable according to claim 1, wherein the further conductors are run one above the other.

12. The motor vehicle battery cable according to claim 1, wherein the conductors are formed from aluminum or copper.

13. The motor vehicle battery cable according to claim 1, wherein, where conductors are arranged one above the other, tappings are arranged one downstream of the other along an axis.

14. The motor vehicle battery cable according to claim 13, wherein the tappings are arranged parallel to the flat strip conductor in a plane.

15. The motor vehicle battery cable according to claim 1, wherein at least one conductor is in the form of an optical waveguide.

16. A method of producing a motor vehicle battery cable comprising:
    forming a flat strip conductor as a power conductor;
    insulating the power conductor by means of an insulating layer;
    introducing at least one further conductor into the insulating layer; and
    friction welding a bolt through the insulation layer to at least one conductor of the group including the power conductor and the at least one further conductor.

17. The method according to claim 16, wherein the conductors are produced from coiled aluminum strip/sheet.

18. The method according to claim 16, wherein the insulating layer is applied to the conductors by means of extrusion.

19. The method according to claim 16, wherein the conductors are run in receptacles in a carrier profile and in that the carrier profile is insulated together with the conductors.

20. The method according to claim 16, wherein tappings are arranged at least one end of the cable in such way that the tappings from two conductors arranged one above the other are arranged one downstream of the other on the longitudinal axis of the cable.

21. The method according to claim 16, wherein tappings are arranged at least one end of the cable in such a way that that the tappings from two conductors arranged in a plane are arranged in parallel transversely to the longitudinal axis of the cable.

22. The method according to claim 16, wherein tappings are arranged at least one end of the cable in such a way that the tappings from at least two conductors are arranged in a plane parallel to the plane of the wide side of the cable.

* * * * *